United States Patent [19]

Kang et al.

[11] Patent Number: 5,301,037
[45] Date of Patent: Apr. 5, 1994

[54] RESOLUTION CONVERSION WITH SIMULATED MULTI-BIT GRAY

[75] Inventors: Henry R. Kang, Fairport; Robert E. Coward, Rochester, both of N.Y.

[73] Assignee: Xerox Corporation, Stamford, Conn.

[21] Appl. No.: 981,678

[22] Filed: Nov. 25, 1992

[51] Int. Cl.⁵ .......................................... H04N 1/393
[52] U.S. Cl. ................... 358/451; 348/576; 382/54
[58] Field of Search ............... 358/451, 448, 447, 445, 358/456, 466, 426; 382/54, 47; 395/108, 112, 105, 115, 400

[56] References Cited

U.S. PATENT DOCUMENTS

| | | | |
|---|---|---|---|
| 3,976,982 | 8/1976 | Eiselen | 358/451 |
| 4,630,947 | 12/1986 | Yoshida et al. | 400/124 |
| 4,827,352 | 5/1989 | Yoneda | 358/451 |
| 4,829,587 | 5/1989 | Glazer et al. | 382/47 |
| 4,860,118 | 8/1989 | Arimoto | 358/451 |
| 4,907,152 | 3/1990 | Lempriere | 364/413.18 |
| 5,025,325 | 6/1991 | Hudson | 358/451 |
| 5,142,667 | 8/1992 | Dimperio et al. | 395/115 |
| 5,170,466 | 12/1992 | Rogan et al. | 395/400 |
| 5,226,094 | 7/1993 | Eschbach | 358/456 |

Primary Examiner—Mark R. Powell
Assistant Examiner—Madeleine Nguyen
Attorney, Agent, or Firm—Gary B. Cohen

[57] ABSTRACT

A method for converting a set of input image pixels having a first resolution and being represented by a set of input image signals to a set of output image pixels having a second resolution and being represented by a set of output image signals. The method is adapted for use in an electroreprographic machine having a memory for storing images and an image output terminal for printing the images. The method comprises the following steps: first, developing a set of state determination rules which govern the conversion of the set of input image pixels having the first resolution to the set of output image pixels having the second resolution; second, communicating the set of input image signals and the set output image signals to the memory, third, relating a plurality of selected input image pixels with a selected one of the output image pixels; fourth, determining respective binary states of the plurality of selected input image pixels; finally, corresponding the selected output image pixel with one of at least three output states by reference to the determined, respective binary states and one of the state determination rules.

25 Claims, 13 Drawing Sheets

RESOLUTION CONVERSION WITH SIMULATED MULTI-BIT GRAY

BACKGROUND OF THE INVENTION

The present invention relates generally to a technique for converting images in scale or resolution, and more specifically to a technique in which binary input image data of one resolution is converted to gray output image data of another resolution.

Image information, be it color or black and white, is commonly generated in a bitmap format at a particular scale, orientation Θ and resolution K×L×b, corresponding to a desired printer output, where K is a number of spots per unit of length in one dimension, L is a number of spots per unit length in the other dimension, and b is the depth of each pixel, in number of levels. This bitmap is present for every color separation of the output device, i.e., 4 bitmaps for a 4-color output device, 3 for a 3-color, 2 for a 2-color and 1 for a black and white output device. In a common example of a black and white output, image data comprising a bitmap to be printed is provided to a printer suitable for printing at 300 spots per inch (spi) in both dimensions, at a one bit depth giving 2 levels. Many considerations drive this single selection of resolution, including the desirability of providing only a limited number of fonts (alphanumeric bitmaps) so as to use only a limited amount of storage space. Common software packages available on personal computers or for operation of input scanners for document creation also usually provide only a single resolution output. Images are commonly arranged at a fixed orientation Increasingly, the resolution available from printers varies over a wider range of choices. Printer resolutions are available over a range, for example, from less than 200 spi to more than 600 spi. Resolutions vary for a number of reasons, generally related to the quality of the output image. Simply printing a 300 spi bitmap at 400 spi or 600 spi is undesirable however, since the image will be reduced substantially in size on the output page or display. It would be highly desirable to provide the capability of printing any image at any resolution, while selecting the output size and orientation.

It is a common practice to implement conversion of a bitmap of first resolution K×L×b to a bitmap of second resolution M×N×d through simple pixel level and raster level operations, such as pixel doubling. When resolution is changed by integer multiples, the resolution conversion can be achieved by pixel replication. Pixel replication, however, does not best use the capabilities of higher resolution output devices. Hence in performing resolution conversion with a higher resolution output device it is desirable to perform a smoothing operation.

Scaling is an identical operation to resolution conversion, and the number of pixels representing the image is either increased or decreased. In particular, a conversion is implemented for a bitmap of first resolution K×L×b to a bitmap of second resolution M×N×d through simple pixel level and raster level operations, such as pixel doupling, but if the image is then directed to a K×L×b for output, it is considered scaled.

Alternatively, more elaborate methods than pixel replication have been developed to facilitate resolution conversion, some of which are described in the following patent applications:

U.S. patent application Ser. No. 07/513,415; Filed: Apr. 23, 1990; Title: "Bit-Map Image Resolution Converter"

U.S. patent application Ser. No. 07/588,125; Filed: Sep. 25, 1990; Title: "Bit-Map Image Resolution Converter Compensating for Write-White Xerographic Laser Printing"

Each of the above-mentioned patent applications contemplates a method of magnifying, by a predetermined magnification factor (n), original image pixels in two dimensions. The method includes the steps of selecting an original image pixel, as well as determining the binary state of both the selected original image pixel and all immediately surrounding original image pixels. Additionally, the selected original image pixel is expanded into an n×n array of magnified image pixels to represent the magnification of the selected original image pixel. Finally, a binary state is assigned to each pixel in the array of magnified image pixels according to the pattern of binary signals previously determined for the selected original image pixel and all immediately surrounding original image pixels. In these patent applications, the assignment of the binary states to the pixels in the array of magnified image pixels is made according to a set of state determination rules.

Employing sophisticated resolution conversion techniques does not insure that the resulting output image will have a desirable appearance. For instance, the output image can be excessively blocky and/or contain noticeable "jaggies." Hence, smoothing operations are sometimes used in conjunction with the conversion or scaling of the image. Through use of the state determination rules in the techniques of the above-mentioned applications, smoothing operations are achieved. For example, the method of the patent application entitled "Bit-Map Image Resolution Converter" permits such operations as smoothing of edges, smoothing of half-bitting effects and smoothing of lines. Moreover, the method of the patent application entitled "Bit-Map Image Resolution Converter Compensating for Write-White Xerographic Laser Printing" ("Compensating for Write-White Application") permits enhancing of single bits in printing and compensating for loss of resolution in write-white printing. Indeed, the compensating technique disclosed in the Compensating for Write-White Application is presently employed in the DocuTech ® electronic printer manufactured by Xerox ® Corporation. The pertinent portions of the above-mentioned patent applications entitled "Bit-Map Image Resolution Converter" and "Bit-Map Image Resolution Converter Compensating for Write-White Xerographic Laser Printing" are incorporated herein by reference.

The following patents relate to the area of resolution conversion:

U.S. Pat. No. 4,630,947; Patentee: Yoshida et al. Issued: Dec. 23, 1986.

U.S. Pat. No. 4,829,587; Patentee: Glazer et al. Issued: May 9, 1989.

U.S. Pat. No. 4,907,152; Patentee: Lempriere; Issued: Mar. 6, 1990

U.S. Pat. No. 4,630,947 discloses an enlarged pattern generator for generating an enlarged dot matrix pattern from an original dot matrix pattern by providing up to four mutually adjacent dots.

U.S. Pat. No. 4,829,587 discloses a device for rescaling an image in which a gray level output is produced by convolving the image with a filter kernal.

U.S. Pat. No. 4,907,152 discloses a method for increasing the resolution of a computed tomography (CT) scanner where the density of the captured data is averaged by use of density values obtained on successive first and second scans, wherein the first scan is offset from the second scan.

While an advantageous technique for using state determination rules to convert input image data of one resolution to output image data of a second resolution is disclosed by U.S. patent application Ser. No. 07/513,415, these rules are only be used to convert binary input image data to binary output image data. It would be desirable to provide a rules-based technique in which binary input image data of one resolution is converted to gray output image data of another resolution.

SUMMARY OF THE INVENTION

In accordance with the present invention, in an electroreprographic machine of the type capable of manipulating an image represented by a plurality of image pixels and outputting the manipulated image at an image output terminal, there is provided an image processing apparatus for converting a set of input image pixels having a first resolution and being represented by a set of input image signals to a set of output image pixels having a second resolution and being represented by a set of output image signals. The image processing apparatus comprises: a memory for storing the input image signals and the output image signals; an image manipulation processor communicating with the memory and storing a set of state determination rules, the rules governing the conversion of the set of input image pixels to the set of output image pixels, the image manipulation processor including: means for designating one of the input image pixels as a target pixel and relating the target pixel with a selected one of the output image pixels, means for determining respective binary states of selected input image pixels in the set of input image pixels, the selected input image pixels being adjacent the target pixel, and means for corresponding the selected output image pixel with one of at least three output states by reference to the determined, respective binary input states and one of the state determination rules.

In accordance with another aspect of the invention, there is provided a method for converting a set of input image pixels having a first resolution and being represented by a set of input image signals to a set of output image pixels having a second resolution and being represented by a set of output image signals in an electroreprographic machine of the type capable of manipulating images represented by a plurality of image pixels stored in an image manipulation processor, the electroreprographic machine having a memory for storing images and an image output terminal for printing the images. The method comprises the steps of: developing a set of state determination rules which govern the conversion of the set of input image pixels having the first resolution to the set of output image pixels having the second resolution; communicating the set of input image signals and the set output image signals to the memory; relating a plurality of selected input image pixels with a selected one of the output image pixels; determining respective binary states of the plurality of selected input image pixels; and corresponding the selected output image pixel with one of at least three output states by reference to the determined, respective binary states and one of the state determination rules.

In accordance with yet another aspect of the invention there is provided a method for scaling a set of binary image pixels having a first magnification and being represented by a first set of image signals to a set of gray image pixels having a second magnification and being represented by a second set of image signals in an electroreprographic machine of the type capable of manipulating an image, represented by a plurality of image pixels, in an image manipulation processor, the electroreprographic machine having a memory for storing images and an image output terminal for printing the images. The method comprises the steps of: defining a set of binary image pixels; determining the binary state of each binary image pixel in the set; selecting at least one of the binary image pixels in the set as a target pixel to be scaled; defining a magnified pixel array to represent the magnification of the target pixel; developing a set of state determination rules based on the positional relationship of a selected one of the pixels in the magnified pixel array to selected ones of the pixels in the set; and assigning one of at least three gray values to the selected one of the pixels in the magnified pixel array in accordance with one of the rules in the set of developed state determination rules.

These and other aspects of the invention will become apparent from the following description, the description being used to illustrate a preferred embodiment of the invention when read in conjunction with the accompanying drawings.

DESCRIPTION OF A PREFERRED EMBODIMENT

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
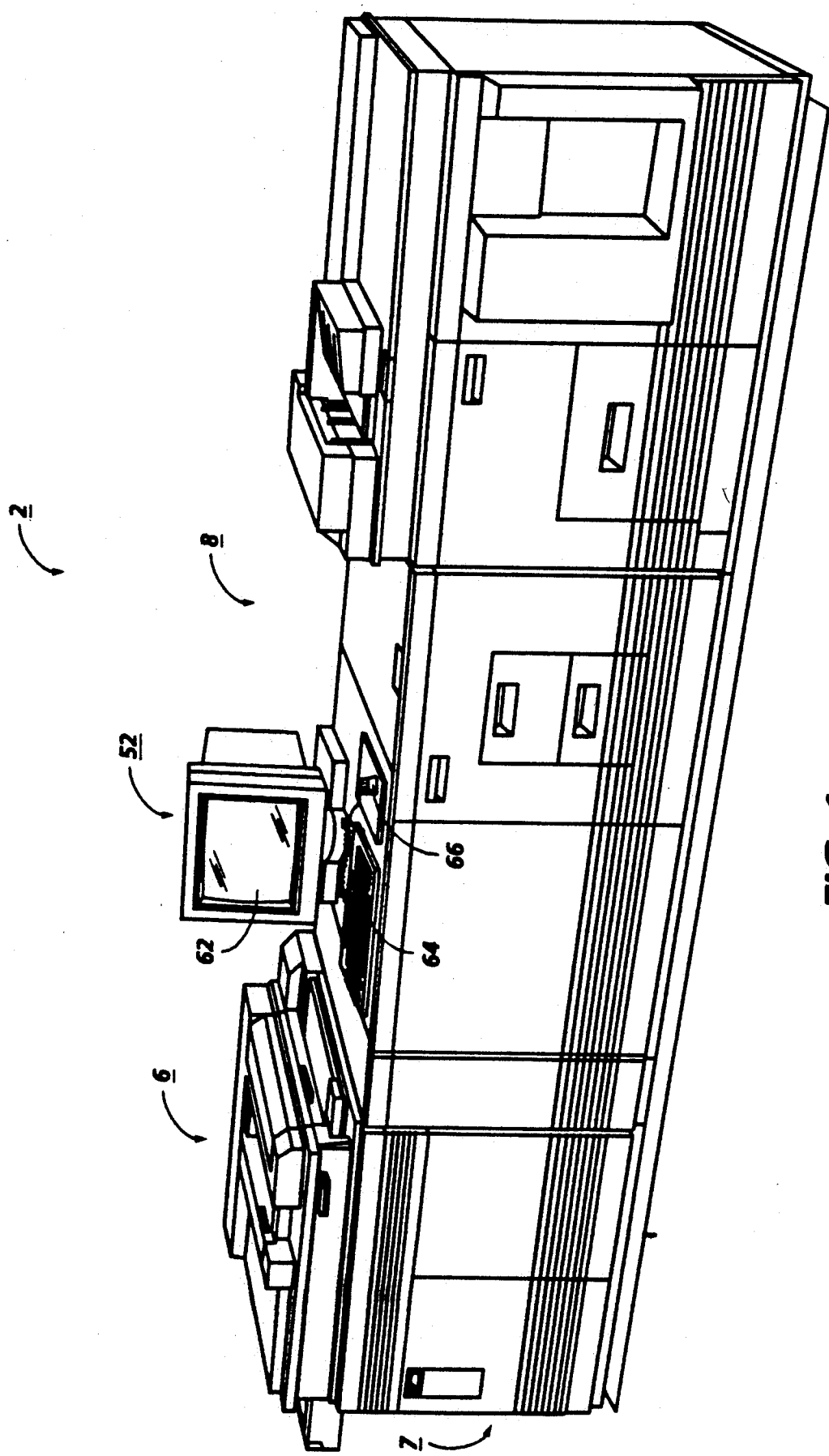
FIG. 1 is a perspective view of an electroreprographic machine upon which a method of the present invention can be executed.
Figure 2:
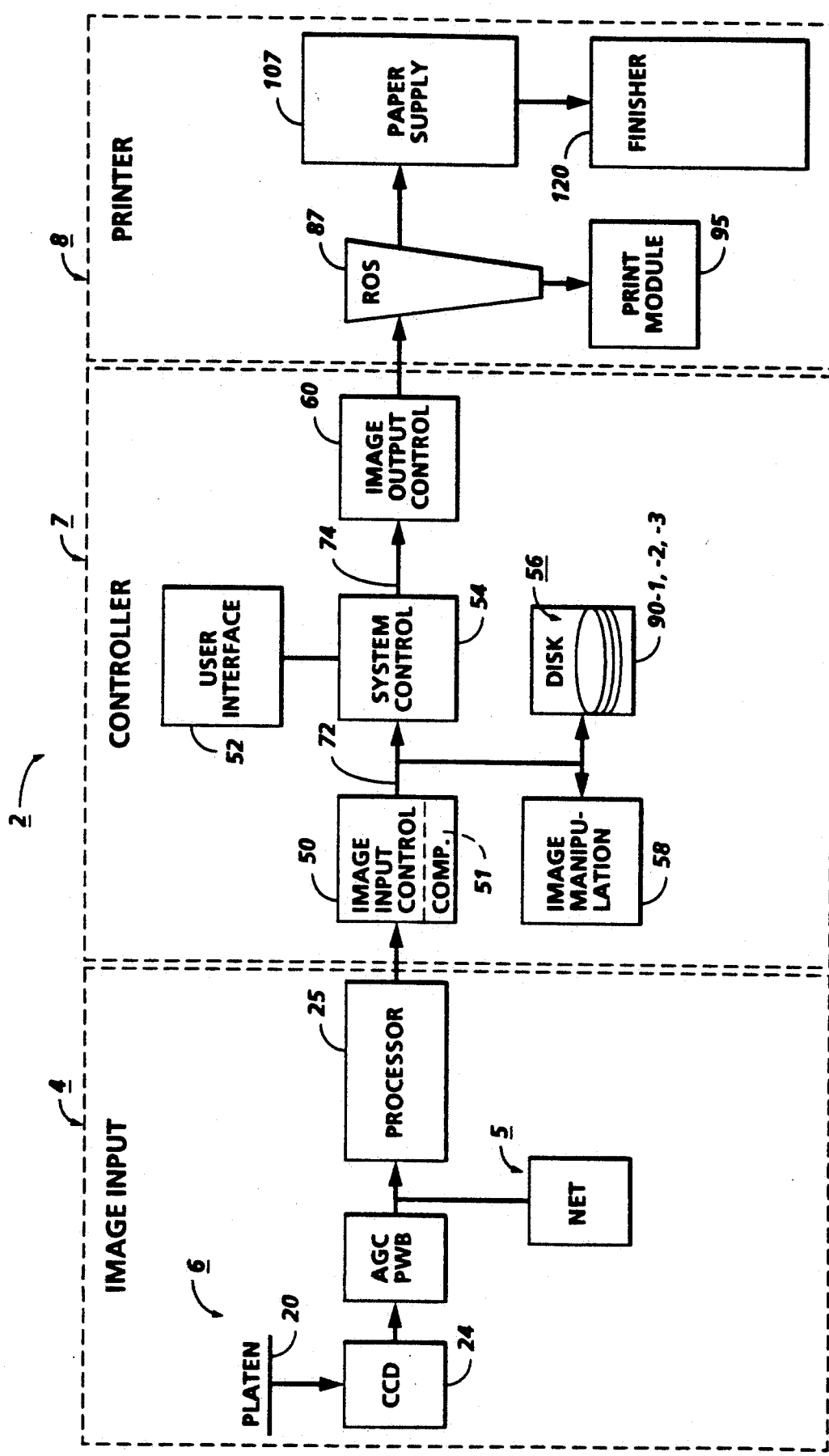
FIG. 2 is a block diagram of the electroreprographic machine of FIG. 1.

Referring to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and onsite image inputs, enabling system 2 to provide network, scan, and print services. Other system combinations may be envisioned such as a stand alone printing system with on-site image input (i.e., a scanner), controller, and printer; a network printing system with remote input, controller, and printer, etc. While a specific printing system is shown and described, the present invention may be used with other types of printing systems. For example, printer section 8 may instead use a different printer type such as ink jet, ionographic, etc.

Figure 3:
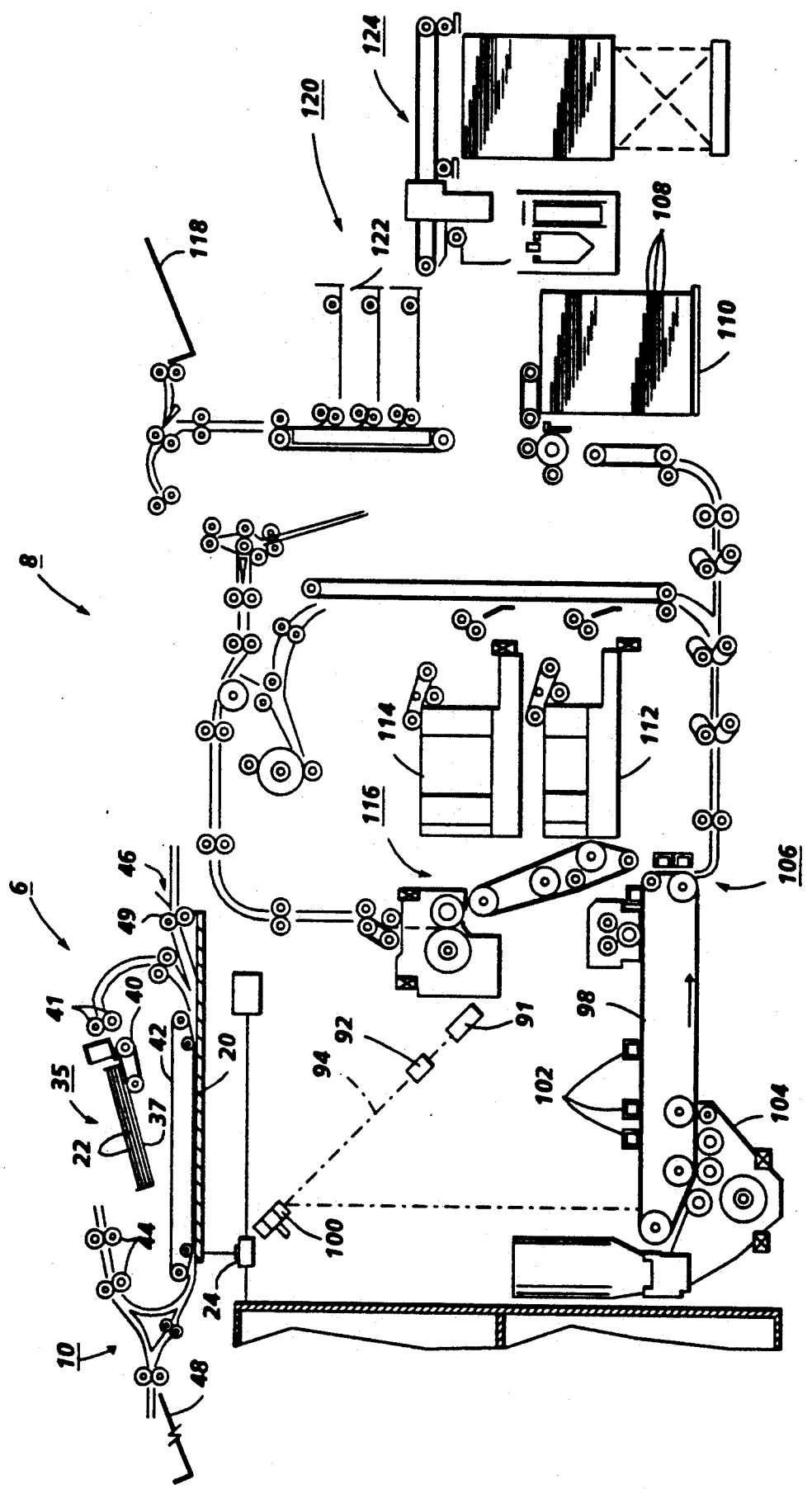
FIG. 3 is a partial, schematic view of the image input and printer sections of FIG. 2.
Figure 4:
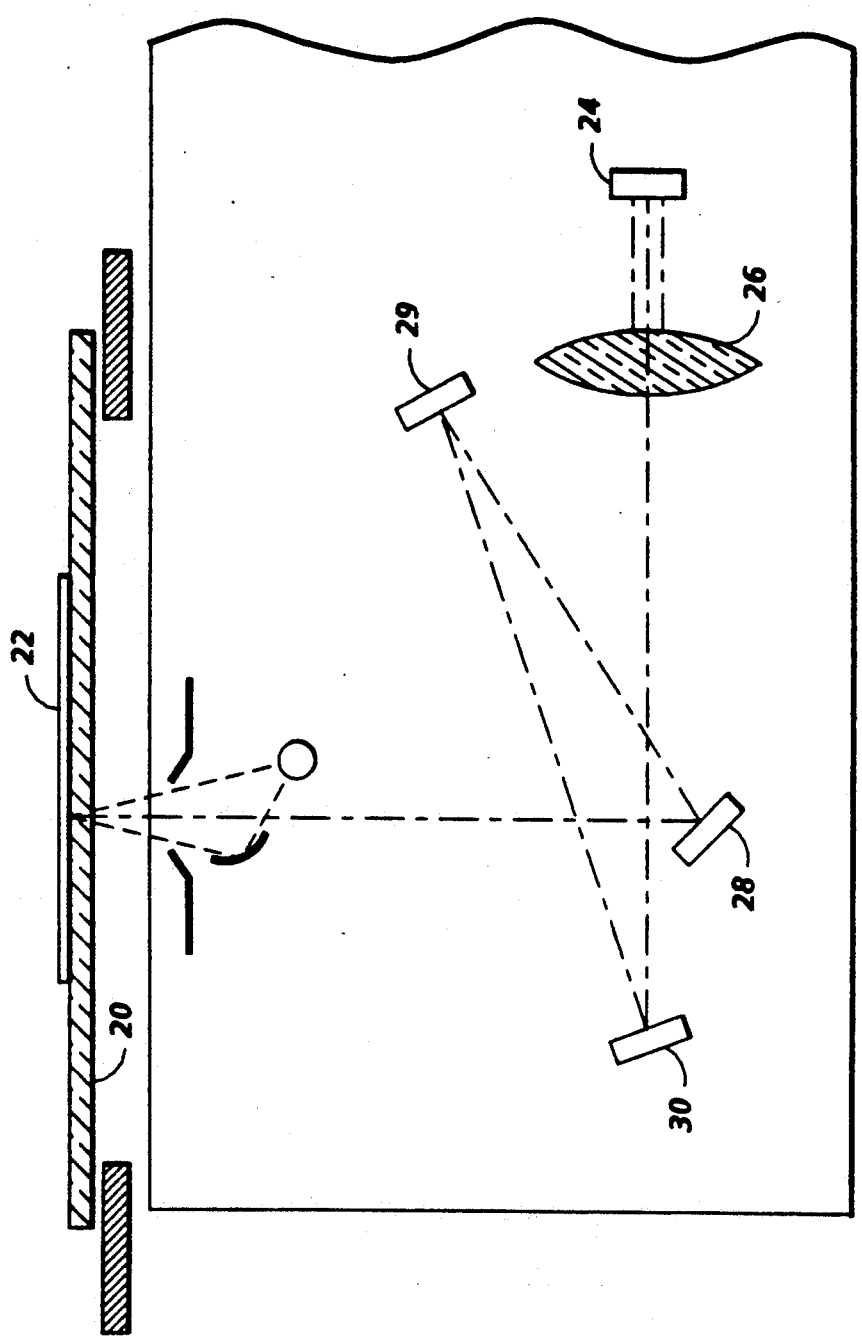
FIG. 4 is a partial, schematic, elevational view of an optics section shown of FIG. 3.

Referring particularly to FIGS. 2-4, for off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, etc. may be envisioned.

For on-site image input, section 4 has a document scanner 6 with a transparent platen 20 on which documents 22 to be scanned are located. One or more linear arrays 24 are supported for reciprocating scanning movement below platen 20. Lens 26 and mirrors 28, 29, 30 cooperate to focus array 24 on a line like segment of platen 20 and the document being scanned thereon. Image data in the form of image signals or pixels from net 5 or array 24 are input to processor 25 for processing. After processing, the image signals are output to controller section 7.

Processor 25 converts the analog image signals output by array 24 to digital. Processor 25 further processes image signals as required to enable system 2 to store and handle the image data in the form required to carry out the job programmed. Processor 25 also provides enhancements and changes to the image signals such as filtering, thresholding, screening, cropping, scaling, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the manual mode, document handler 35 is pivoted upwardly to expose platen 20. This permits the document 22 to be manually placed on platen 20 following which array 24 is operated to scan the document. When scanning is completed, the document is removed to clear platen 20 for the next document. For Book mode, the book is manually positioned face down on platen 20 with the center line of the book aligned with positioning indicia (not shown) located along the border of platen 20. By programming the system, either one or both of the pages of the book open on the platen are scanned. The process is repeated for different pages of the book until all of the pages desired have been scanned following which the book is removed to clear platen 20.

For operation in the CFF mode, computer forms material is fed through slot 46 and advanced by feed rolls 49 to document feed belt 42 which in turn advances a page of the fanfold material into position on platen 20.

Referring to FIGS. 1, 2 and 5, controller section 7 includes image input control 50, User Interface (UI) 52, system control 54, main memory 56, image manipulation section 58, and image output control 60. Image data from processor 25 of image input section 4 is input to image input control 50 where the data is compressed and temporarily stored in Random Access Memory (RAM) 61 pending transfer to main memory 56 where the data is held pending use.

Figure 5A:
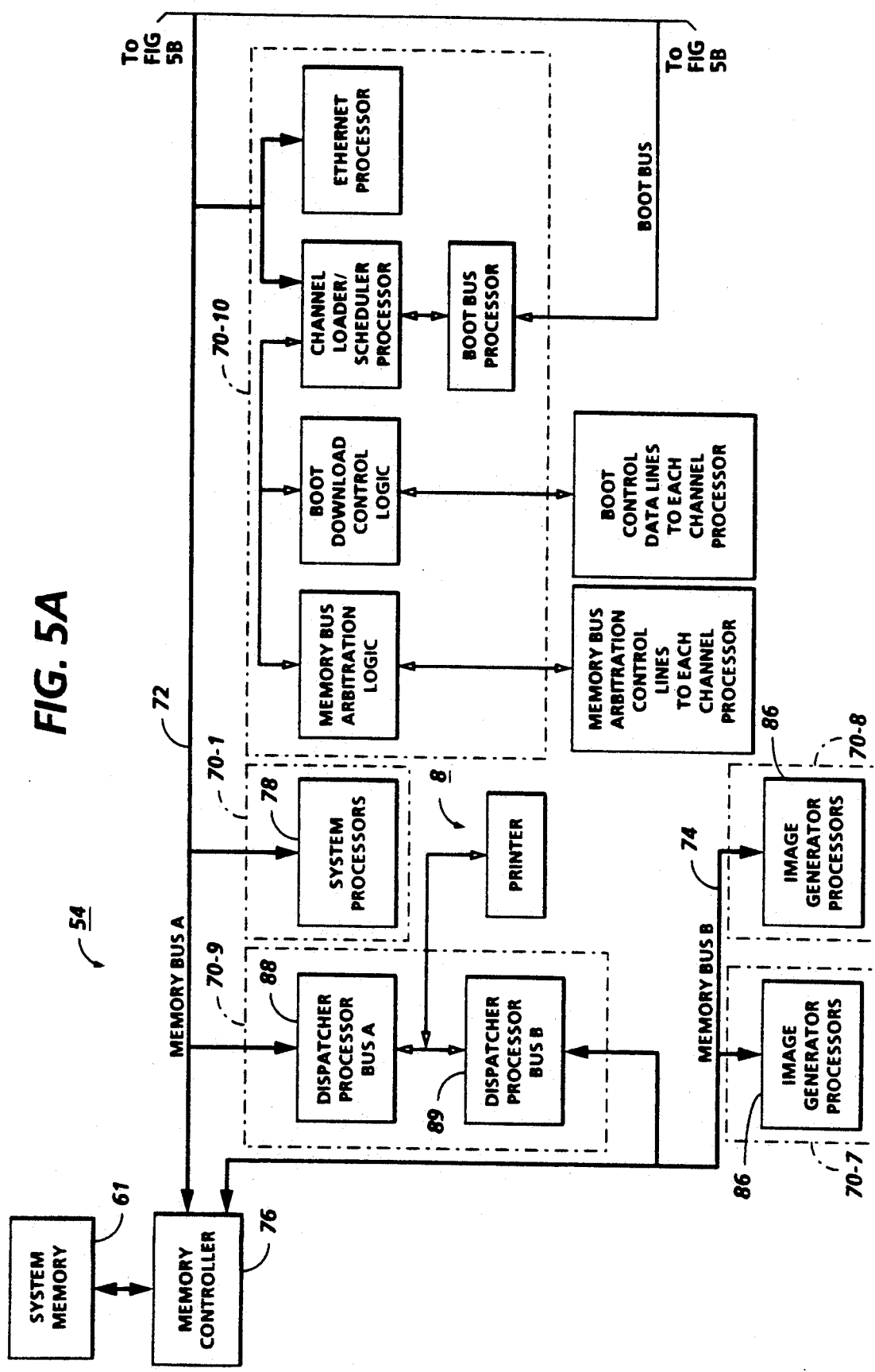
FIGS. 5A-5C conjunctively represent a block diagram of the controller section of FIG. 2.
Figure 5B:
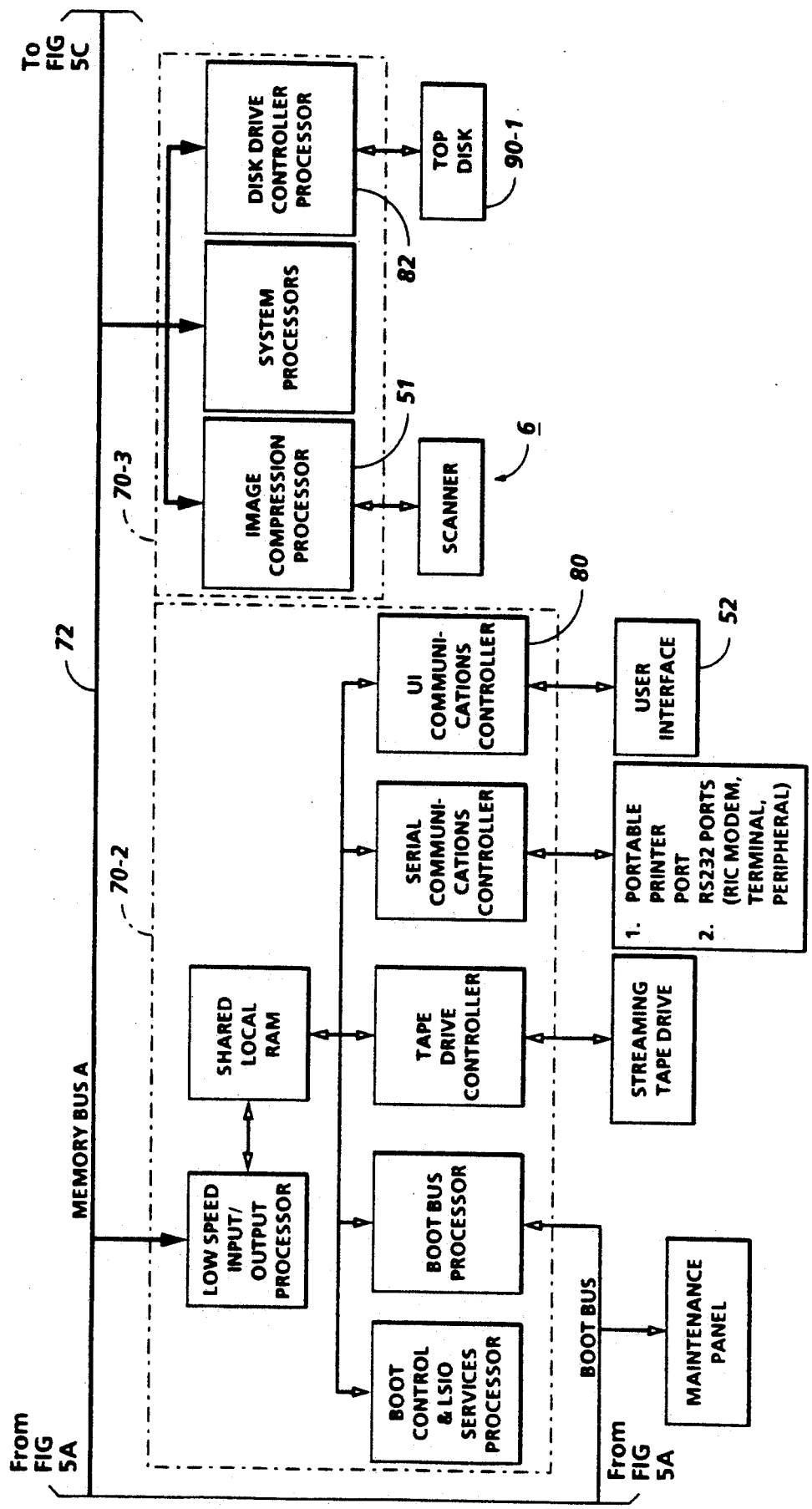
Figure 5C:
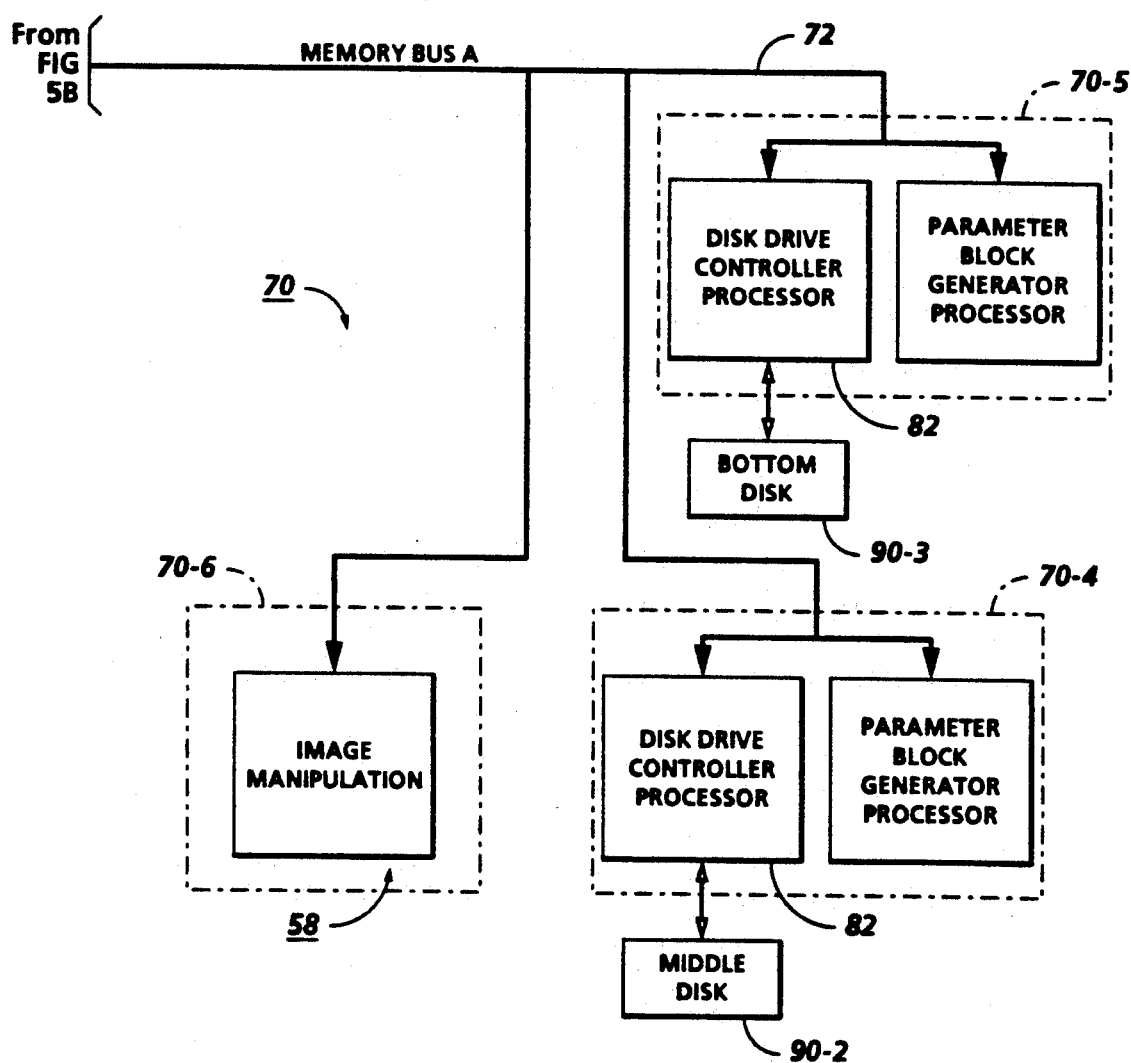

As seen in FIGS. 5A and 5B, control section 7 has a plurality of Printed Wiring Boards (PWBs) 70 coupled with one another and with RAM 61 by memory buses 72, 74. Memory controller 76 couples RAM 61 with buses 72, 74. PWBs 70 include system processor PWB 70-1 having plural system processors 78; low speed I/O processor PWB 70-2 with UI communication controller 80 for transmitting data to and from UI 52; PWBs 70-3, 70-4, 70-5, with disk drive controller/processors 82 for transmitting data to and from disks 90-1, 90-2, 90-3 respectively of main memory 56, with PWB 70-3 having image compressor/processor 51 for compressing the image data; image manipulation PWB 70-6 with image manipulation processor 85; and image generation processor PWBs 70-7, 70-8 with image generation processors 86 for processing the image data for output to printer section 8 and dispatch processor PWB 70-9 for controlling transmission of data via dispatch processors 88, 89 to and from printer section 8.

UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to move a cursor to point the cursor to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps selected such as collation, make ready, decomposition, resolution conversion, etc., are carried out. Following processing, the data may be returned to main memory 56, sent to UI 52 for display on touchscreen 62, or sent to image output control 60.

Image data output to image output control 60 is decompressed and readied for printing by image generating processors 86 of PWBs 70-7, 70-8. Following this, the data is output by dispatch processors 88, 89 of PWB 70-9 to printer section 8. Image data sent to printer section 8 for printing is normally purged from memory 56 to make room for new image data.

Referring to FIGS. 2 and 3, printer section 8 has a laser printer with a laser 91 modulated in accordance with the content of an image signal input by acousto-optic modulator 92 to provide imaging beam 94. Beam 94 is scanned across moving photoreceptor 98 in the form of a belt by the mirrored facets of a rotating polygon 100 to imagewise expose photoreceptor 98 and create the latent electrostatic images represented by the image signal input to beam modulator 92. Photoreceptor 98 is uniformly charged by corotrons 102 at a charging station preparatory to exposure by imaging beam 94. The latent electrostatic images are developed by developer 104 and transferred at transfer station 106 to a sheet 108 of copy substrate material brought forward in timed registration therewith from either main paper tray 110 or from auxiliary paper tray 112, or 114. The developed image on sheet 108 is permanently fixed or fused by fuser 116, the resulting prints being discharged to output tray 118, or alternately to finisher 120. Finisher 120 includes a stitcher 122 for stitching or stapling the prints together to form books and a thermal binder 124 for adhesively binding the prints into books.

Figure 6:
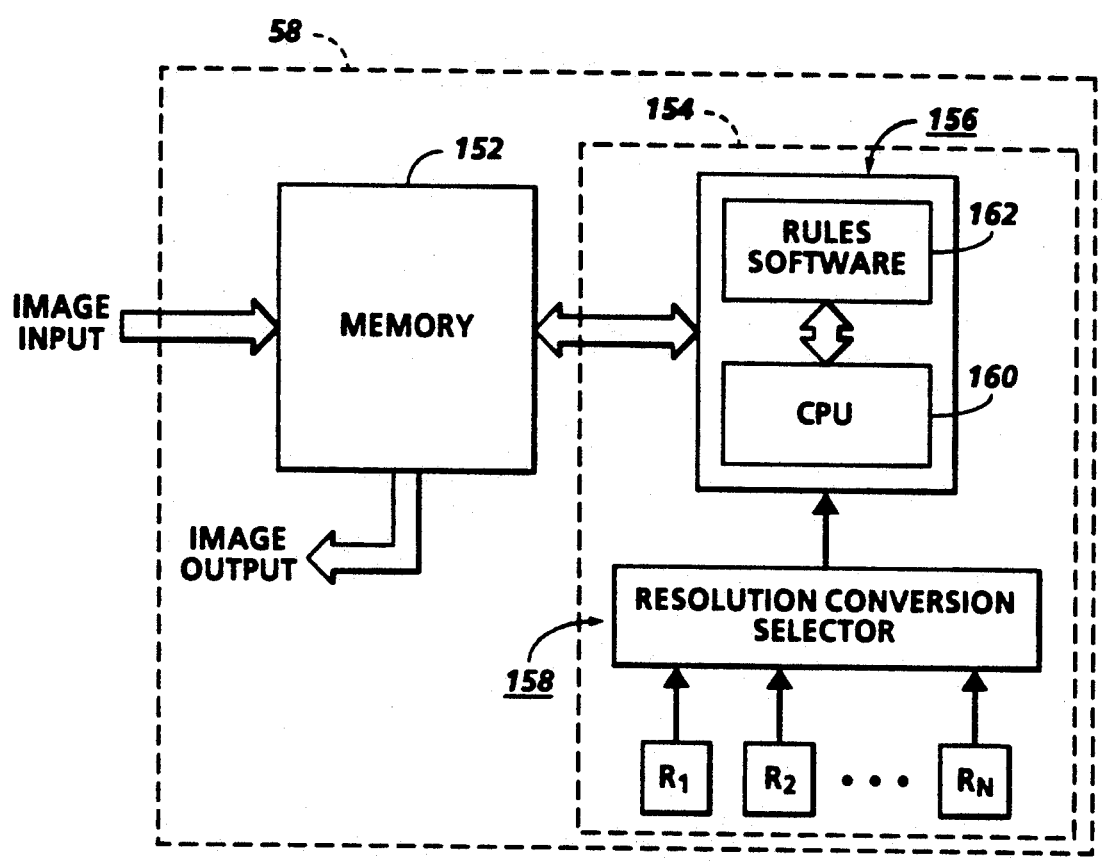
FIG. 6 is a block diagram of an image manipulation section of FIG. 5C.

Referring to FIG. 6, the image manipulation section 58 (FIG. 5C) is discussed in further detail. The section 58 includes a memory section 152 coupled with an image conversion section 154, the section 154 including a rules processing section 156 coupled with a resolution conversion selector 158. The rules processing section 156 comprises a processor 160, such as a CPU, coupled with a memory section 162 for storing various sets of state determination rules, the implementation of which rules will be discussed in further detail below. The sets are programmed in appropriate software format, such as C-programmed format, for use by the CPU. The desired resolution conversion is obtained when one of designated resolution conversions $R_1, R_2, \ldots, R_N$ communicated to the section 154 by way of the resolution conversion selector 158, the selector, in one example including a suitable input device, such as the UI 52. In operation, the resolution conversion to be performed is selected with the resolution conversion selector 158 and an input image of a first resolution is stored in the memory 152. N lines of the input image are transmitted to the processor 160 at a time, and by reference to the selected set of state determination rules, the details of which rules are explained below, the resolution conversion is performed to obtain output pixels of a second resolution. The resulting, converted output pixels are stored in the memory 152, and eventually transmitted to either the printer section 8 for printing, another suitable output for outputting, or another memory section for storing of the same.

Figure 7:
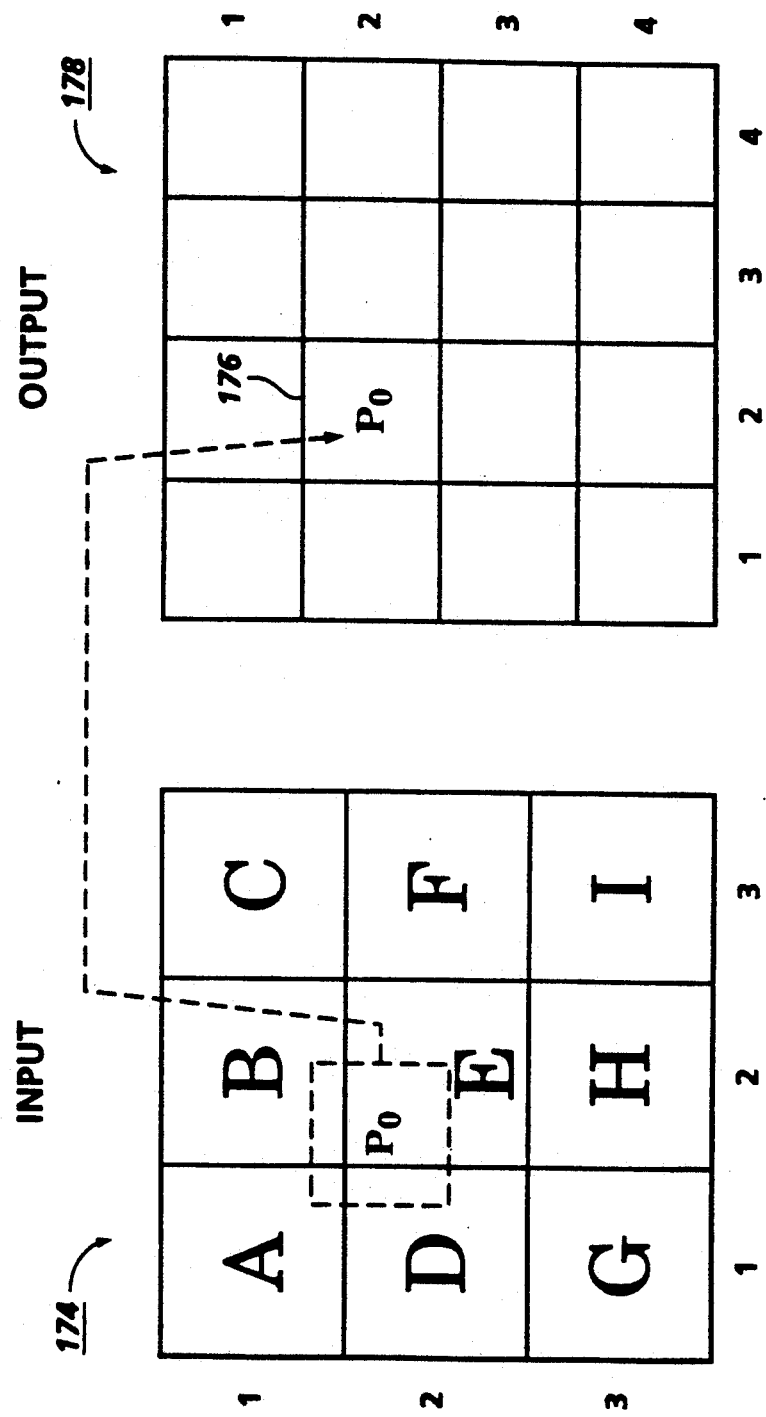
FIG. 7 is a schematic view depicting the manner in which a 3×3 window of image input pixels is related positionally with an image output pixel and the image output pixel is positioned in a 4×4 array of image output pixels.
Figure 8:
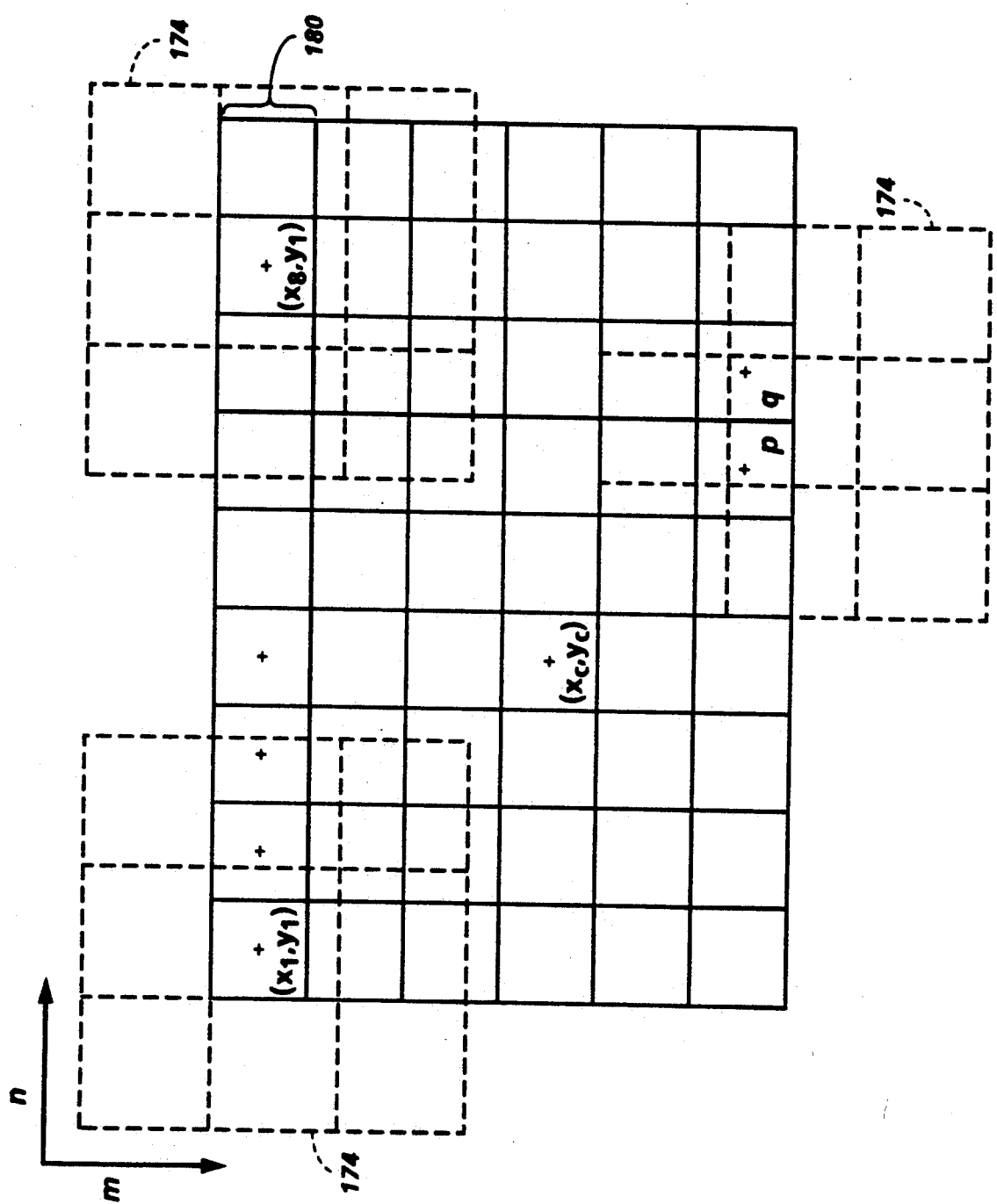
FIG. 8 is a schematic view of a plurality of output pixels related positionally with three 3×3 windows of input image pixels.

Referring to FIGS. 7 and 8, the application of the rules is explained in further detail. In accordance with the present invention, the resolution conversion of an input image is implemented in a pixel by pixel fashion based upon neighboring image pixels, i.e. the resolution conversion is performed with a "near-neighbor approach". The near-neighbor approach is similar, in some respects, to a "mathematical morphological approach", and is oriented to image texture. The near-neighbor approach accommodates for the microstructure of near neighbor pixels for interpolating an output pixel. This approach, which is heuristic in nature, processes specific textures in a selected area referred to as a "window".

With the near neighbor approach, an interpolation algorithm, of the type embodied in the rules below, is used in conjunction with the window, the window "moving through" an image in a consistent, and repeating pattern. This sort of movement is discussed in further detail in U.S. patent application Ser. No. 07/895,063 entitled "Unquantized Resolution Conversion of Bitmap Images Using Error Diffusion", filed Jun. 8, 1992, the pertinent portions of which are incorporated herein by reference. Referring to FIG. 7, an exemplary window defining a group of input image pixels is designated by the numeral 174. For ease of discussion, the input image pixels are designated with the letters A, B, C, D, E, F, G, H and I. Additionally, the window 174 is shown as being positionally related asymmetrically with respect to an output pixel 176, and the output pixel $P_0$ is shown as being part of an exemplary 4×4 matrix 178 of output image pixels. While the window 174 is shown as having n×n pixels, it should be recognized that the window could have n×m pixels. That is, the objects of the present invention can be obtained whether the window is symmetrical or not.

Referring to FIG. 8, the movement of the window relative to an input image is discussed in further detail. For the illustrated embodiment of FIG. 8, the window 174 is shown at three exemplary locations, and is positioned so that the pixel E is lined up with the first pixel $(x_1, y_2)$ of the image. Various known techniques can be used to compensate for various boundary conditions which may prevail. In the preferred embodiment, the window is moved across a first scanline 180, in a "fast scan direction" until the image pixels of the first scanline 180 have been processed completely. Subsequently, the window is preferably shifted down by one scanline and the process is continued. The process is repeated for each scanline until the conversion for the entire image has been completed.

Various center positions of respective output pixels (referred to in FIG. 8 as "$(x_c, y_c)$") are obtained with the following equations:

$$x_c = (n+0.5) \cdot d_{ix} \cdot R_{ix}/R_{ox} \quad n=0, 1, 2, 3, \ldots \quad (1)$$

$$y_c = (m+0.5) \cdot d_{iy} \cdot R_{iy}/R_{oy} \quad m=0, 1, 2, 3, \ldots \quad (1)$$

where $d_{ix}$ and $d_{iy}$ are the input pixel sizes in the x and y direction, respectively;

$R_{ix}$ and $R_{iy}$ are the input resolutions in the x and y directions, respectively; and $R_{ox}$ and $R_{oy}$ are the output resolutions in the x and y directions, respectively.

As shown in FIG. 8, the center position is used to keep track of the relative positions of windows of input pixels and output pixels. A given window can relate to more than one center position. For example, the window in the lower right-hand corner of FIG. 8 is used to obtain the values of both output pixels p and q because both of their centers are within the center pixel of the corresponding input window. As can be appreciated by those skilled in the art, the rules defined below may require some slight modifications when the window encompasses more than one center position. An example of such modification can be found in the discussion of FIG. 9 below.

It has been found that processing in the near neighbor approach is implemented optimally through use of lookup tables. An example of a look-up table implementation can be found in U.S. patent application Ser. No. 07/737,297 entitled "Method of Resolution Conversion", filed Jul. 29, 1991, the pertinent portions of which are incorporated herein by reference. It should be recognized that the lookup table for the present implementation, which yields two bit output, would have more entries than a look-up table which yields single bit (binary) output. That is, in one example, while the number of input entries would not change, the number of output bits would double.

It has been found that the following rules apply to a resolution conversion of $300 \times 300 \times 1$ spi to $400 \times 400 \times 2$ spi. That is, an output gray pixel $P_0$ can be generated by use of the following conditions. In the following rules it will be noted that white is designated arbitrarily as '0' and black is designated arbitrarily as '1'.

---

If E is white and B, D are black
then    if F, H are white    $P_0$ = '10'
    else    if C, F or G, H are white    $P_0$ = '01'
        else $P_0$ = '00'
If A, B, D are white and E, C, F, I or E, F, I, H or E, G, H, I
are black
then    if the number of black pixels in the window is
greater than 4    $P_0$ = '10'
    else
    if the number of black pixels in the window is
lesser than 4    $P_0$ = '01'
Else    $P_0$ = '11', if E is black
    $P_0$ = '00' if E is white.

---

In the preferred embodiment, gray levels are assigned for $P_0$ in accordance with the following table:

TABLE 1

| | Two-Bit Gray Levels | |
|---|---|---|
| Level | Name | Binary |
| 1 | white | 00 |
| 2 | light gray | 01 |
| 3 | dark gray | 10 |
| 4 | black | 11 |

Figure 9:
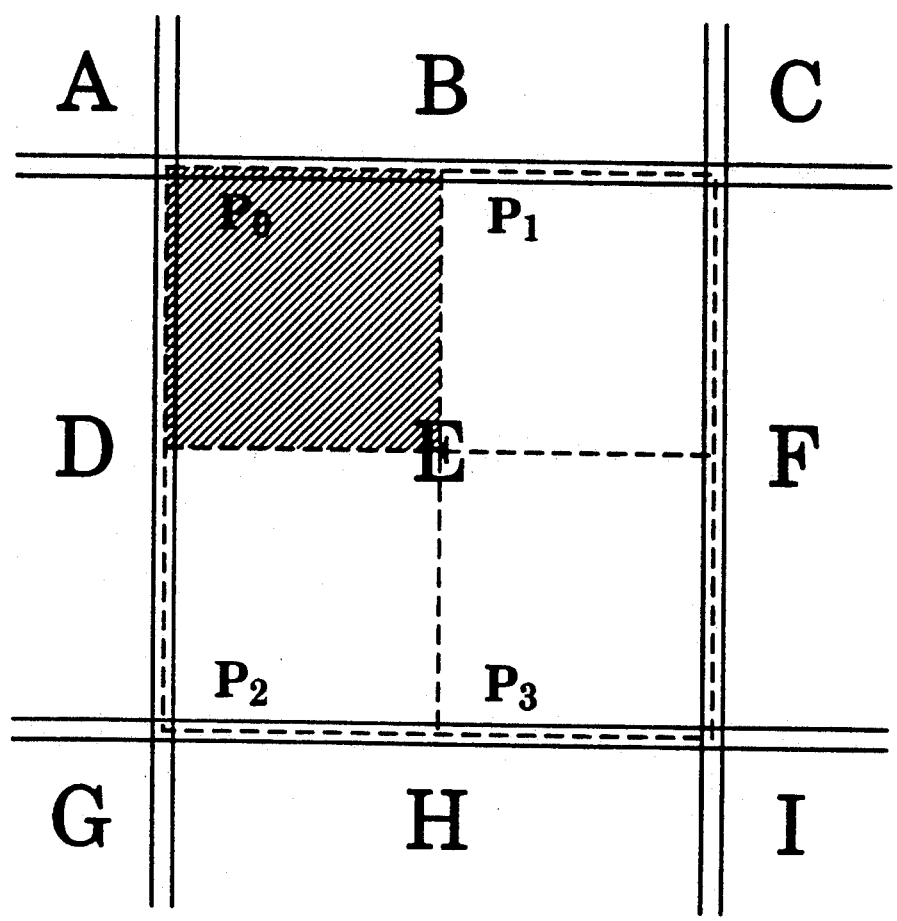
FIG. 9 is a schematic view of a 2× magnification technique.

It will be appreciated by those skilled in the art that while the above resolution conversion applies to a case in which scaling up occurs, the rules, in a slightly modified form, would apply appropriately to a case of decimation in which a conversion of $400 \times 400 \times 1$ spi to $300 \times 300 \times 2$ spi is performed. Additionally, while the above case demonstrates a conversion in which the window is asymmetrically positioned relative to the output pixel $P_0$ the window, as shown in FIG. 9, can be positioned symmetrically relative to a plurality of output pixels. In the illustrated embodiment of FIG. 10 a magnification of $2\times$, or a conversion of $300 \times 300 \times 1$ spi to $600 \times 600 \times 2$ spi, is shown. It should be recognized, however, that the present method is capable of magnifying or decimating images by non-integer factors. It has been found that the following set of exemplary state determination rules applies to the $2\times$ magnification case:

Consider $P_0$, each set of four values includes output intensity signals for $P_0$, $P_1$, $P_2$ and $P_3$, respectively:

---
If ABD are Black then (11)(01)(01)(00)
If ABCD are Black then (11)(10)(01)(00)
If ABDG are Black then (11)(01)(10)(00)
If ABCDG are Black then (11)(01)(01)(00)
If BD are Black then (11)(00)(00)(00)
If ABCDF are Black then (01)(01)(00)(00)
If ABDGH are Black then (01)(00)(01)(00)
---

Consider $P_1$, each set of four values includes output intensity signals for $P_0$, $P_1$, $P_2$ and $P_3$, respectively:

---
If BCF are Black then (01)(11)(00)(01)
If BCFI are Black then (01)(11)(00)(10)
If ABCF are Black then (10)(11)(00)(01)
If ABCFI are Black then (01)(11)(00)(01)
If BF are Black then (00)(11)(00)(00)
If BCFHI are Black then (00)(01)(00)(01)
If ABCDF are Black then (01)(01)(00)(00)
---

Consider $P_2$, each set of four values includes output intensity signals for $P_0$, $P_1$, $P_2$ and $P_3$, respectively:

---
If DGH are Black then (01)(00)(11)(01)
If ADGH are Black then (10)(00)(11)(01)
If DGHI are Black then (01)(00)(11)(10)
If ADGHI are Black then (01)(00)(11)(01)
If DH are Black then (00)(00)(11)(00)
If ABDGH are Black then (01)(00)(01)(00)
If DFGHI are Black then (00)(00)(01)(01)
---

Consider $P_3$, each set of four values includes output intensity signals for $P_0$, $P_1$, $P_2$ and $P_3$, respectively:

---
If FHI are Black then (00)(01)(01)(11)
If FGHI are Black then (00)(01)(10)(11)
If CFHI are Black then (00)(10)(01)(11)
If CFGHI are Black then (00)(01)(01)(11)
If FH are Black then (00)(00)(00)(11)
If DFGHI are Black then (00)(00)(01)(01)
If BCFHI are Black then (01)(01)(00)(01)
---

Referring to the rules immediately above, each of the outputs $P_0$, $P_1$, $P_2$ and $P_3$ is related to a respective set of rules, and each rule of a set is characterized by four outputs. In particular, the four outputs correspond respectively to the values of $P_0$, $P_1$, $P_2$ and $P_3$ as determined with respect to a selected one of $P_0$, $P_1$, $P_2$ and $P_3$. For example, referring to the first set of rules, when $P_0$ is considered and ABD are black, then $P_0=11$, $P_1=01$, $P_2=01$ and $P_3=00$. The output for each rule is obtained by ORing the outputs $P_0$, $P_1$, $P_2$ and $P_3$ with an appropriate logical device(s) and defaulting to the output with the highest optical density.

Referring again to FIGS. 7 and 8, the case of decimation in which a conversion of 600×600×1 spi to 300×300×2 spi is performed. In particular, such decimation case is obtained with the following set of state determination rules:

```
If E is white and B, D are black
then    if F, H are white    P0 = '10'
        else    if C, F or G, H are white    P0 = '01'
                else P0 = '00'
If A, B, D are white and E, C, F, I or E, F, I, H or E, G H, I
are black
then    if the number of black pixels in the window is
greater than 4                                P0 = '10'
        else
        if the number of black pixels in the window is
Else    P0 = '11', if the number of black pixels in the area
        EFHI is 4
        P0 = '10', if the number of black pixels in the area
        EFHI is 3
        P0 = '01', if the number of black pixels in the area
        EFHI is 2
        P0 = '00', if the number of black pixels in the area
        EFHI is 1
```

Figure 10A:
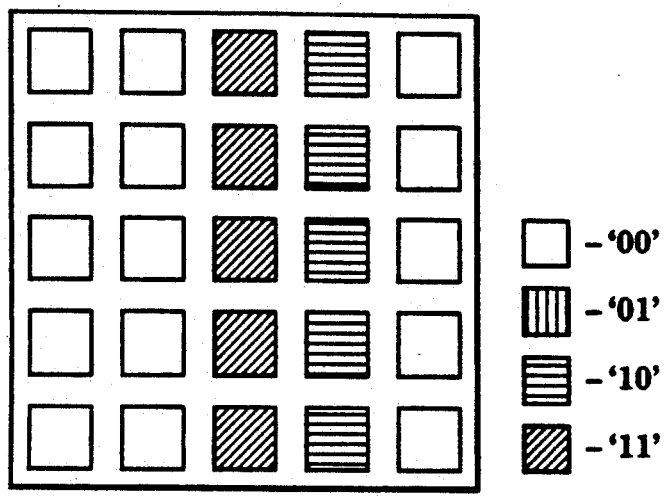
FIG. 10A-10B are schematic, plan views of lines, formed with image output pixels, having their edges enhanced in accordance with the method of the present application.
Figure 10B:
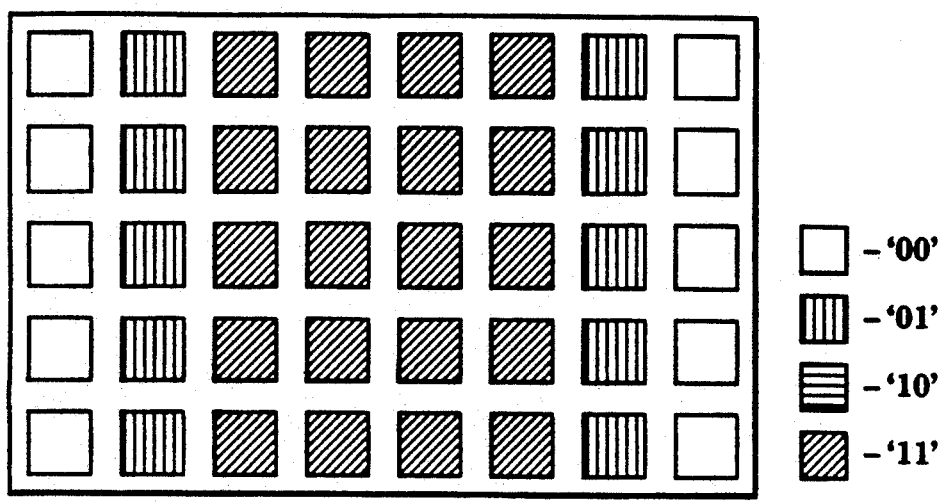

It should be appreciated that the above rules for the 2×magnification case can be modified or adjusted readily to obtain various levels of optical density. The capability to provide varying levels of optical density can be useful when sending bitmaps for write-black printers to write-white printers, which write-white printers tend to thin lines. Write-white printers and a resolution conversion approach which accommodates for thinning of lines in write-white printers can be found in patent application Ser. No. 07/588,125 entitled "Bit-Map Image Resolution Converter Compensating for Write-White Xerographic Laser Printing." Indeed, through manipulation of optical density, by use of the present rules, various dilation and smoothing effects can be obtained. Referring to FIGS. 10A and 10B, certain dilation effects which can be obtained with the present technique are shown. In particular, for thin lines, such as the one shown in FIG. 10A the rules can be readily adjusted so that pixels along one edge of the thin line are dark gray. On the other hand, for thicker lines, such as the one shown in FIG. 10B, the rules can be adjusted readily to "grow" the thick line gradually by adding light gray pixels to both edges of the thick line. The technique of optical density compensation during resolution conversion is also applicable for exchanging binary images between any IOTs that have differing resolutions and TRCs.

Figure 11A:
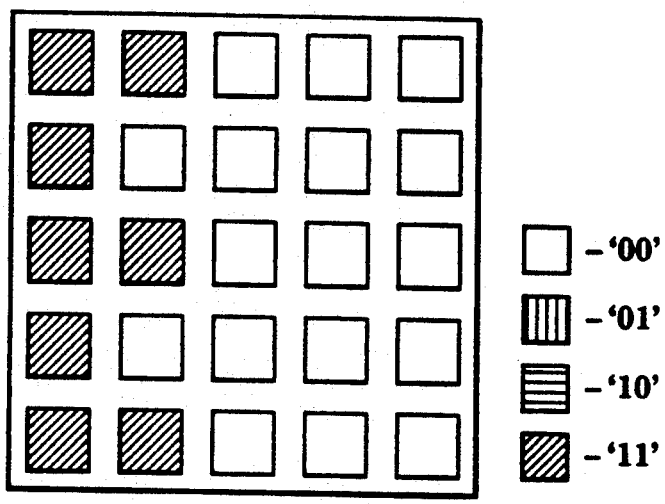
FIGS. 11A-11B are schematic views which serve to illustrate the manner in which smoothing is obtained with the method of the present application.
Figure 11B:
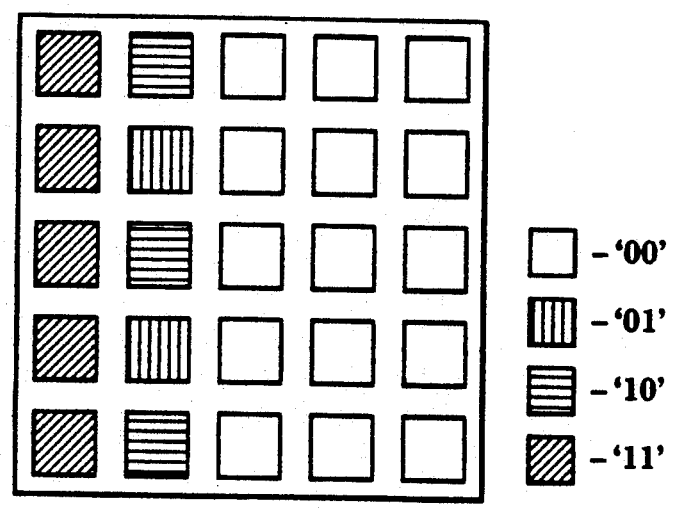

As indicated in patent application Ser. No. 07/513,415 entitled "Bit-Map Image Resolution Converter" and U.S. patent application Ser. No. 07/588,125, and shown in FIG. 11A, an edge can be "half-bitted" by alternating black and white pixels therealong. While this allows for a relatively smooth and uniform edge, the present inventors have found that a relatively smooth and uniform edge can also be obtained by adjusting the rules appropriately. For example, referring to FIG. 11B, slight adjustment of the rules results in an edge which is formed from alternating light-gray and dark-gray pixels. It should be recognized that the edge shown in FIG. 11B could also be enhanced through employment of all light-gray pixels or all dark-gray pixels.

Numerous features of the present invention will be appreciated by those skilled in the art. One feature of the present method is that it extends the near neighbor approach in that it provides for multi-bit output. In particular the invention provides a general method for continuous scaling while interpolating gray levels in a relatively wide range of conversion ratios. Another feature of the present invention is that it provides a rather simple, yet effective technique which can be implemented with a minimum amount of hardware/firmware. Yet another feature of the present invention is that it employs a set of state determination rules which are extremely flexible and, with little or no modification, can be used to perform a wide variety of resolution conversions. Yet another feature of the present invention is that it permits the enhancing of lines by, for example, smoothing the edges thereof.

What is claimed is:

1. In an electroreprographic machine of the type capable of manipulating an image represented by a plurality of image pixels and outputting the manipulated image at an image output terminal, an image processing apparatus for converting a set of input image pixels having a first resolution and being represented by a set of input image signals to a set of output image pixels having a second resolution and being represented by a set of output image signals, comprising:

a memory for storing the input image signals and the output image signals;

an image manipulation processor communicating with said memory and storing a set of state determination rules, the rules governing the conversion of the set of input image pixels to the set of output image pixels, the image manipulation processor including:

means for designating one of the input image pixels as a target pixel and relating the target pixel with a selected one of the output image pixels, means for determining respective binary states of selected input image pixels in the set of input image pixels, the selected input image pixels being adjacent the target pixel, and means for corresponding the selected output image pixel with one of at least three output states by reference to the determined, respective binary states and one of the state determination rules, the output state of the selected output image pixel varying as a direct function of the respective states of the selected input image pixels and said corresponding means outputting the selected output image pixel in a print-ready format.

2. The electroreprographic machine of claim 1 in which said image manipulation processor stores a second set of state determination rules, further comprising means for indicating which one of the sets of rules is to be employed by said corresponding means in corresponding the selected output image pixel with the one of at least three output states.

3. The electroreprographic machine of claim 1, in which the image output terminal comprises a printing device for printing lines with edges, wherein the rules are designed for enhancing the line edge.

4. The electroreprographic machine of claim 1, wherein the first resolution is 300×300×1 spi and the second resolution is 400×400×2 spi.

5. The electroreprographic machine of claim 1, wherein the first resolution is 300×300×1 spi and the second resolution is 600×600×2 spi.

6. An image manipulation processor, communicating with a memory, the memory storing input image signals representative of a set of input image pixels having a first resolution and output image signals representative of a set of output image pixels, said image manipulation processor storing a set of state determination rules, the rules governing the conversion of the set of input image pixels to the set of output image pixels, said image manipulation processor comprising:

means for designating one of the input image pixels as a target pixel and relating the target pixel with a selected one of the output image pixels;

means for determining respective binary states of selected input image pixels in the set of input image pixels, the selected input image pixels being adjacent the target pixel; and means for corresponding the selected output image pixel with one of at least three output states by reference to the determined, respective binary states and one of the state determination rules, the output state of the selected output image pixel varying as a direct function of the respective states of the selected input image pixels and said corresponding means outputting the selected output image pixel in a print-ready format.

7. The electroreprographic machine of claim 6, wherein the first resolution is 300×300×1 spi and the second resolution is 400×400×2 spi.

8. The electroreprographic machine of claim 6, wherein the first resolution is 300×300×1 spi and the second resolution is 600×600×2 spi.

9. The image manipulation processor of claim 6 in which said image manipulation processor stores a second set of state determination rules, further comprising means for indicating which one of the sets of rules is to be employed by said corresponding means in corresponding the selected output image pixel with the one of at least three output states.

10. A method for converting a set of input image pixels having a first resolution and being represented by a set of input image signals to a set of output image pixels having a second resolution and being represented by a set of output image signals in an electroreprographic machine of the type capable of manipulating images represented by a plurality of image pixels stored in an image manipulation processor, the electroreprographic machine having a memory for storing images and an image output terminal for printing the images, comprising the steps of:

developing a set of state determination rules which govern the conversion of the set of input image pixels having the first resolution to the set of output image pixels having the second resolution;

communicating the set of input image signals and the set output image signals to the memory;

relating a plurality of selected input image pixels with a selected one of the output image pixels;

determining respective binary states of the plurality of selected input image pixels; and corresponding the selected output image pixel with one of at least three output states by reference to the determined, respective binary states and one of the state determination rules, the output state of the selected output image pixel varying as a direct function of the respective states of the selected input image pixels and said corresponding means outputting the selected output image pixel in a print-ready format.

11. The method of claim 10, wherein the relating step comprises configuring the plurality of selected input image pixels with a window, the window having an area of n×n pixels.

12. The method of claim 10, in which the selected output image pixel is corresponded with one of four output states, wherein the corresponding step comprises configuring the four output states with the following four gray levels: 00, 01, 10 and 11.

13. The method of claim 10, wherein said method comprises the first resolution being less than the second resolution.

14. The method of claim 10, wherein said method comprises the first resolution being greater than the second resolution.

15. The method of claim 10, in which the method is employed to designate a plurality of output image pixels with one of at least three output states and the image output terminal comprises a printing device for printing the plurality of output image pixels as a line with an edge, wherein the developing step comprises designing the one or more of the state determination rules so that the the line edge is enhanced.

16. The method of claim 10, wherein said method comprises the first resolution being 300×300×1 spi and the second resolution being 400×400×2 spi.

17. The method of claim 10, wherein said method comprises the first resolution being 300×300 ×1 spi and the second resolution being 600×600×2 spi.

18. A method for scaling a set of binary image pixels having a first magnification and being represented by a first set of image signals to a set of gray image pixels having a second magnification and being represented by a second set of image signals in an electroreprographic machine of the type capable of manipulating an image, represented by a plurality of image pixels, in an image manipulation processor, the electroreprographic machine having a memory for storing images and an image output terminal for printing the images, comprising the steps of:

defining a set of binary image pixels;

determining the binary state of each binary image pixel in the set;

selecting one of the binary image pixels in the set as a target pixel to be scaled;

defining a magnified pixel array to represent the magnification of the target pixel;

developing a set of state determination rules based on the positional relationship of a selected one of the pixels in the magnified pixel array to selected ones of the pixels in the set; and assigning one of a white output, a black output and a midtone output to the selected one of the pixels in the magnified pixel array in accordance with one of the rules in the set of developed state determination rules.

19. The method of claim 18, further comprising the steps of:

developing a second set of state determination rules based on the positional relationship of a second selected one of the pixels in the magnified pixel array; and assigning one of at least three gray values to the second selected one of the pixels in the magnified pixel array in accordance with one of the rules in the second set of developed state determination rules.

20. The method of claim 19, further comprising the step of dividing the magnified pixel array into four quadrants defined by horizontal and vertical axes which intersect at a center of the array, wherein the first and second selected pixels of the magnified pixel array are respectively disposed in two of the four quadrants.

21. The method of claim 18, in which a plurality of gray values are assigned to the selected pixel in the magnified pixel array, further comprising the step of combining the plurality of gray values to obtain an output image signal for the selected pixel in the magnified pixel array.

22. The method of claim 18, in which the method is employed to designate a plurality of output image pixels with one of at least three output states and the image output terminal comprises a printing device for printing the plurality of output image pixels as a line with an edge, wherein the developing step comprises designing one or more of the state determination rules so that the the line edge is enhanced.

23. The method of claim 18, wherein said method includes scaling by an integer factor.

24. The method of claim 18, wherein said method comprises the first resolution being $300 \times 300 \times 1$ spi and the second resolution being $400 \times 400 \times 2$ spi.

25. The method of claim 18, wherein said method comprises the first resolution being $300 \times 300 \times 1$ spi and the second resolution being $600 \times 600 \times 2$ spi.

* * * * *